Jan. 9, 1968    C. L. WING    3,362,728
HITCH CONSTRUCTION
Filed April 11, 1966    2 Sheets-Sheet 1

Cyrus L. Wing
INVENTOR.

Jan. 9, 1968 C. L. WING 3,362,728
HITCH CONSTRUCTION
Filed April 11, 1966 2 Sheets-Sheet 2

Cyrus L. Wing
INVENTOR.

United States Patent Office 3,362,728
Patented Jan. 9, 1968

3,362,728
HITCH CONSTRUCTION
Cyrus L. Wing, Rte. 3, Greenfield, Ohio 45123
Filed Apr. 11, 1966, Ser. No. 541,614
10 Claims. (Cl. 280—512)

ABSTRACT OF THE DISCLOSURE

A pair of socket-defining members movably supported from a support member independent of any positive connection therewith and in a readily bodiy removable and replaceable manner and for shifting between first and second coacting positions defining (1) a generally spherical socket adapted to retain captive therein a spherical ball member and also an elongated hollow neck opening outwardly of and or less transverse dimension than the diameter of said socket and (2) with the socket deforming members disposed so as to enlarge the minimum transverse dimension of the neck to a dimension greater than the diameter of the aforementioned socket, together with latch means for releasably retaining the socket-defining members in the first mentioned positions.

---

This invention relates to a novel and useful hitch construction and more specifically to a hitch construction including both an improved socket-defining member and an improved ball member.

The hitch construction of the instant invention is unique in that there are no fasteners utilized in the construction of the socket-defining portions thereof that releasably swivelly engage the ball portion thereof. A pair of socket-defining elements, each including recessed means defining a segment of a generally spherical socket, are provided and are movably supported from a support member and positionable in first coacting positions defining a generally spherical socket therebetween adapted to hold captive and swivelly receive therebetween a ball element. The spherical socket defined includes an elongated hollow neck opening outwardly of the socket and which is of less transverse dimension than the diameter of the socket. The socket-defining elements are also swingable to second positions with the portions thereof defining the neck spaced further away from the longitudinal center-line of the neck thereby enlarging the minimum transverse dimension of the neck to a dimension greater than the diameter of the socket whereby the ball element receivable in the socket may be withdrawn from between the socket-defining elements through the enlarged neck. In addition, latch means is movably mounted on the support member and operatively engageable with the socket-defining elements to urge them toward their first coacting positions defining the socket and to retain the socket-defining elements in their first socket-defining positions.

The support member from which the socket-defining elements are supported comprises a tubular member in one end portion of which the socket-defining members are disposed. If it is desired, the one end of the tubular member receiving the socket-defining elements may be the forward end of a trailer tongue and include opposite side portions having openings formed therethrough which portions of the socket-defining elements project when they are shifted out of the first coacting positions thereof defining the socket. The latch means of the hitch construction comprises means mounted on the tubular member for reciprocation longitudinally thereof and including portions movable past the outer ends of the openings and registrable therewith for engagement with the socket elements to urge them toward their first socket-defining positions and to retain the elements against movement from their socket-defining positions.

The main object of this invention is to provide a hitch construction including novel components which may be readily assembled and utilized to releasably and swivelly receive a ball hitch element without relying upon the use of fasteners of any type.

Another object of this invention is to provide a hitch construction including latch means shiftable to an operative position releasably retaining the movable socket-defining members in socket-defining positions for captively retaining a ball element and which is yieldingly urged toward its operative position and includes means coacting with the socket-defining members for camming the socket-defining members into their operative positions as the latch is moved to its operative position.

A final object of this invention to be specifically enumerated herein is to provide a hitch construction which will conform to conventional forms of manufacture, be of simple construction and easy to use so as to provide a device that will be economically feasible, long lasting and relatively trouble free in operation.

These together with other objects and advantages which will become subsequently apparent reside in the detail of construction and operation as more fully hereinafter described and claimed, reference being had to the accompanying drawings forming a part hereof, wherein like numerals refer to like parts throughout, and in which:

Figure 1:
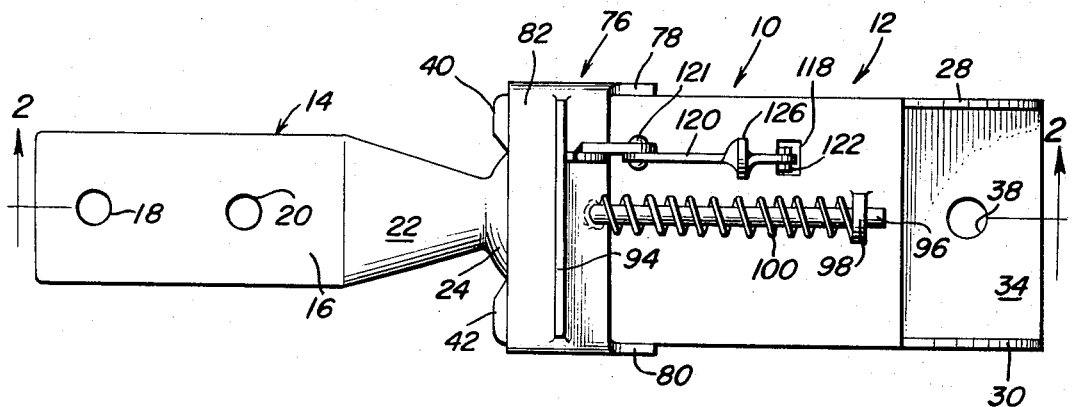
FIGURE 1 is a top plan view of the hitch construction of the instant invention.
Figure 2:
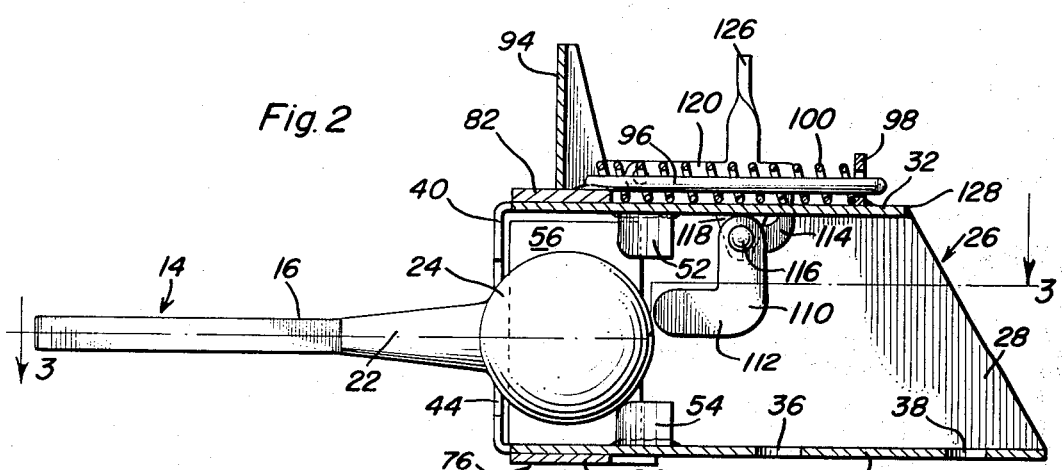
FIGURE 2 is a fragmentary vertical longitudinal sectional view taken substantially upon a plane indicated by the section line 2—2 of FIGURE 1.
Figure 7:
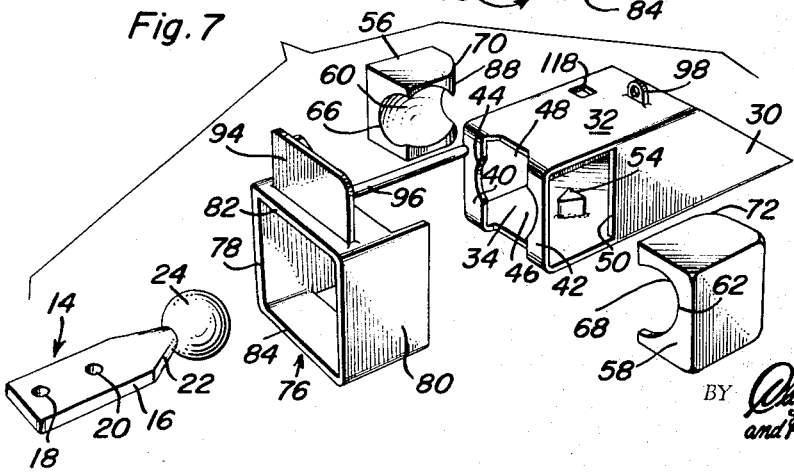
Figure 6:
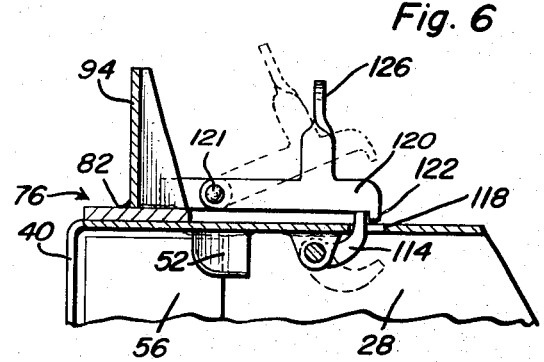

FIGURE 6 is a fragmentary longitudinal vertical sectional view of the hitch construction illustrating the manner in which the latch of the hitch construction may be removed from the remainder thereof in order to facilitate maintenance on the hitch construction or to allow the socket-defining members thereof to be readily replaced by a second pair of socket-defining members coacting to define a smaller or larger diameter socket; and FIGURE 7 is an exploded perspective view of the hitch construction of the instant invention.

Referring now more specifically to the drawings, the numeral 10 generally designates the hitch construction of the instant invention. The hitch construction 10 includes a socket-defining portion generally referred to by the reference numeral 12 and a ball hitch element generally referred to by the reference numeral 14.

The ball hitch element 14 includes a plate-like body portion 16 apertured on one end portion as at 18 and 20 for suitable securement to a draft vehicle and including a longitudinally extending neck portion 22 on its other end portion provided with a diametrically enlarged spherical or ball element 24 on its free end.

The socket-defining portion 12 includes a body generally referred to by the reference numeral 26 defined by a tubular member rectangular in cross-section and including a pair of upstanding opposite side walls interconnected at corresponding upper and lower marginal edge portions by means of a top wall 32 and a bottom wall 34, respectively. The bottom wall 34 is suitably apertured as at 36 and 38 whereby the tubular body may have its rear end telescoped over the forward end of a trailer tongue and secured to the latter by means of suitable fasteners passed through the apertures 36 and 38 and secured to the trailer tongue. Of course, the tubular body 26 may comprise the forward end portion of a tubular trailer tongue or the body 26 may be secured in any convenient manner to any portion of a vehicle which is to be towed.

With attention now invited more specifically to FIGURE 7 of the drawings it may be seen that the tubular body 26 includes a pair of opposite side vertically extending partial front walls 40 and 42 whose adjacent edge portions are notched as at 44 and 46, respectively. In addition, the forward portions of the side walls 28 and 30 have been omitted so as to define a pair of opposite side openings 48 and 50 at the forward ends of the side walls 28 and 30, respectively.

A pair of abutment members 52 and 54 are suitably secured to the inner surfaces of the top and bottom walls 32 and 34, respectively, in vertically aligned and spaced relation and in any convenient manner such as by welding.

Figure 3:
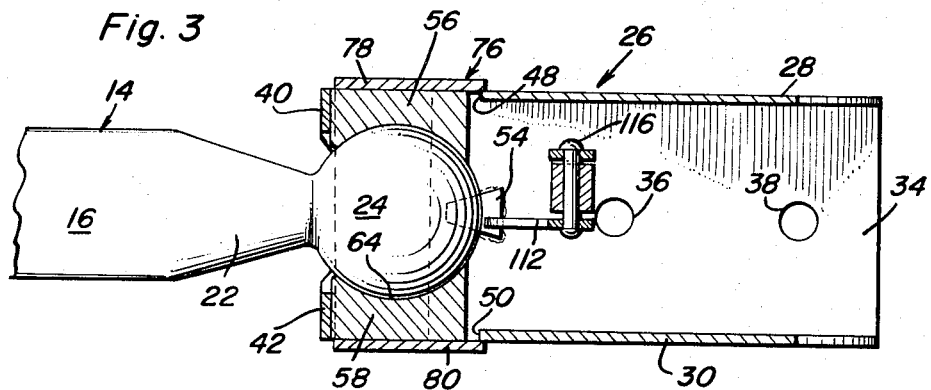
FIGURE 3 is a fragmentary horizontal sectional view taken substantially upon the plane indicated by the section line 3—3 of FIGURE 2.

A pair of socket-defining members or bodies 56 and 58 including partial spherical socket portions 60 and 62, respectively, are disposed in the forward end of the tubular body 26 just inwardly of the openings 48 and 50, see FIGURE 3. The socket-defining portions 60 and 62 confront each other and the remote ends of the socket-defining members or blocks 56 and 58 terminate in the openings 48 and 50. From FIGURE 3 of the drawings it may be seen that the socket portions 60 and 62 define segments of a generally spherical socket 64 in which the spherical or ball element 24 is held captive for universal movement relative to the body 26. The edge portions 66 and 68 of the bodies 56 and 58 which define the forwardmost extremities of the socket portions 60 and 62 when the bodies 56 and 58 are positioned relative to each other as illustrated in FIGURE 3 of the drawings, coincide generally with the notches 44 and 46 formed in the partial front walls 40 and 42. Thus, as can best be seen from FIGURE 3 of the drawings, the end of the neck portion 22 adjacent the ball element 24 may be swung about the center of the socket 64 during swivelling oscillation of the ball element 24 in the socket 64 to a limited degree before the neck portion 22 abuts either the partial front walls 40 and 42 and/or the edge portions 66 and 68 of the bodies 56 and 58.

Figure 4:
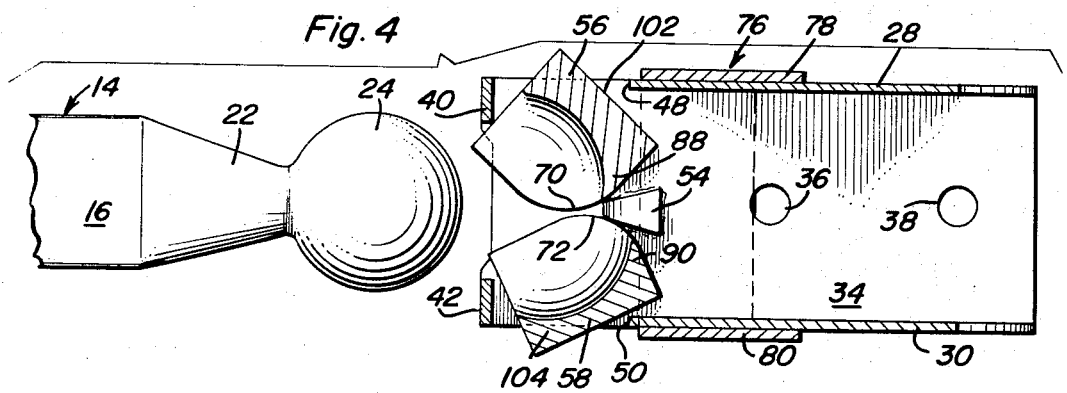
FIGURE 4 is a fragmentary horizontal sectional view similar to that of FIGURE 3 but illustrating the socket-defining members of the hitch construtcion in their released positions and the associated ball element displaced outwardly of the socket defined by the hitch construction.
Figure 5:
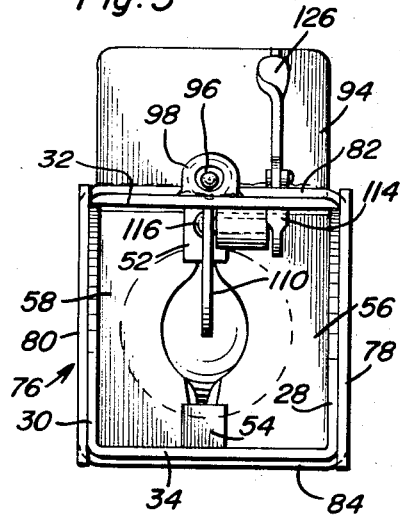
FIGURE 5 is a rear elevational view of the hitch construction.

With attention now invited more specifically to FIGURE 4 of the drawings, it may be seen that the bodies 56 and 58 include upper and lower arcuate surfaces 70 and 72, respectively, disposed in sliding contacting relation with the forward portions of the opposite side surfaces of the upper and lower abutment members 52 and 54. It may of course be noted from FIGURE 4 of the drawings that the bodies 56 and 58 are only loosely received in the forward end of the body 26 and that they may be readily removed through the openings 48 and 50, respectively. However, a latch member generally referred to by the reference numeral 76, see FIGURE 7, is provided and is in the form of a shortened tubular body also generally rectangular in cross-sectional shape including opposite side walls 78 and 80 and top and bottom walls 82 and 84. The inside dimensions of the tubular body 76 are slightly greater than the corresponding outside dimensions of the body 26 so that the body 76 is loosely slidably received on the body 26 and shiftable between the operative and inoperative positions illustrated in FIGURES 3 and 4, respectively.

Assuming that the hitch construction 10 has its component parts positioned as illustrated in FIGURE 4, as the ball element 24 is advanced toward the socket portions 66 and 68, the rear portions of the ball element 24 engage the inside rear corner portions 88 and 90 of the bodies 56 and 58 and pivot the latter counterclockwise and clockwise, respectively as viewed in FIGURE 4, until the bodies 56 and 58 are positioned as illustrated in FIGURE 3 of the drawings.

The body 80 includes an upstanding flange 94 from which a guide rod 96 secured thereto extends rearwardly over the top wall 32 and the latter has an apertured upstanding flange 98 secured thereto which slidably receives the free end of the rod 96, a compression spring 100 being disposed about the rod 96 and between the flange 98 and the top wall 82. Of course, the spring 100 urges the body 76 toward the left as viewed in FIGURE 4 of the drawings so that the forward edges of the opposite side walls 78 and 80 of the body 76 slidingly engage the outer surface 102 and 104 of the bodies 56 and 58 when the body 76 is allowed to be biased forwardly by the spring 100. This sliding contacting engagement of the forward edges of the opposite side walls 78 and 80 of the body 76 on the outer surfaces 102 and 104 of the bodies 56 and 58 cams the latter bodies 56 and 58 inwardly toward each other into close embracing engagement with the ball element 24, the body 76 then retaining the bodies 56 and 58 within the body 26.

When the body 76 is positioned as illustrated in FIGURE 3 of the drawings, the outer surfaces 102 and 104 of the bodies 56 are substantially completely enclosed within the body 76 and the forward ends of the bodies 56 and 58 are abutted against the inner surfaces of the partial front walls 40 and 42. Of course, the abutment members 52 and 54 abutting the upper and lower surfaces 70 and 72 of the bodies 56 and 58 prevent rearward shifting of the latter in the body 26 and thus a stationarily positioned socket 64 is provided for swivelly receiving and holding captive the ball element 24. Of course, when it is desired to disengage the ball element 24 from the socket 64, the flange 94 may be pushed rearwardly so as to move the body 76 rearwardly along the body 26 against the biasing action of the spring 100 until the body 76 is positioned as illustrated in FIGURE 4 of the drawings. Then, the ball hitch element 14 need only be pulled forwardly relative to the socket-defining portion 12 in order to cam the members 56 and 58 from the positions thereof illustrated in FIGURE 3 to the positions thereof illustrated in FIGURE 4 whereupon the neck portion of the socket 64 defined by the edge portions 66 and 68 will be greatly increased in diameter thereby allowing the ball element 24 to be withdrawn from the forward end of the body 26 through the enlarged neck.

A bell crank 110 including a first arm portion 112 and a second arm portion 114 is pivotally supported within the body 26 by means of a pivot pin 116 supported from a depending mounting lug 118 secured to the top wall 32 and the arm portion 112 is engageable by the ball element 24 to pivot the bell crank 110 to the position thereof illustrated in solid lines in FIGURE 6 of the drawings with the free end of the arm 114 projecting upwardly through an opening 118 formed in the top wall 32. The free end portion of the arm 114 is engageable by a pivoted latch 120 pivotally supported from the top wall 82 by means of a pivot pin 121 and it may be seen that the free end of the latch 120 includes a downwardly directed projection 122 which is abuttingly engageable with the free end of the arm 114.

The latch 120 includes an upwardly projecting finger-actuatable portion 126 and the projection 122 thereof is engageable with the rear edge 128 of the top wall 32 when the body 76 is shifted to the rearwardly disposed position illustrated in FIGURE 4 of the drawings thereby enabling the projection 122 to retain the body 76 in the position illustrated in FIGURE 4 of the drawings against the biasing action of the spring 100. However, as soon as the ball element 24 is pushed rearwardly into the forward end of the body 26, and the ball element 24 approaches its fully seated position illustrated in FIGURE 3, the rear end of the ball element 24 engages the free end of the arm 112 thereby pivoting the free end of the arm 114 upwardly so as to cause the latch 120 to have its free end swung upwardly. This upward swinging of the free end of the latch 120 will of course disengage the projection 122 from the rear edge 128 of the top wall 32 and allow the spring 100 to slide the body 76 forward to the position thereof illustrated in FIGURE 3. Of course, as can best be seen from FIGURE 6 of the drawings, the projection 122 is also engageable with the free end of the arm 114 and this engagement of the projection 122 with the arm 114 as the body 76 slides to its forwardmost position illustrated in FIGURE 3 of the drawings constitutes a limit stop of forward movement of the body 76 relative to the body 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hitch construction comprising a support member for attachment to a vehicle, a plurality of socket-defining members each including recess means defining a segment of a generally spherical socket of predetermined size, said socket-defining members being movably supported from said support member independent of any positive connection therewith and in a readily bodily removable and replaceable manner and for shifting between first and second coacting positions, said first positions defining a generally spherical socket adapted to retain captive therein a spherical ball member and also an elongated hollow neck opening outwardly of and of less transverse dimension than the diameter of said socket and said members when in said second coacting positions, being disposed with the portions of said socket-defining members defining said neck spaced further away from the longitudinal centerline of said neck enlarging the minimum transverse dimension of said neck to a dimension greater than the diameter of said socket, and latch means mounted on said support member for movement between active and inactive positions and operable, when shifted toward said active positions, to engage said socket-defining members and shift the latter toward and releasably retain said socket-defining members in said first coacting positions.

2. The combination of claim 1 wherein said socket-defining members equal two in number and, when in said first position, are disposed on diametrically opposite portions of the spherical socket defined thereby.

3. The combination of claim 2 wherein said socket-defining members are movably supported from said support member for oscillation between said first and second positions generally about generally parallel axes spaced on diametric opposite sides of said socket and disposed in a plane extending between said socket-defining members and through the approximate center of said socket.

4. The combination of claim 3 wherein said support member comprises a tubular member in one end portion of which said socket-defining members are disposed, said hollow neck defining a longitudinal centerline thereof generally paralleling the longitudinal centerline of said one end of said tubular member.

5. The combination of claim 4 wherein said centerlines at least substantially coincide.

6. The combination of claim 1 wherein said socket-defining members equal two in number and, when in said first position, are disposed on diametrically opposite portions of the spherical socket defined thereby, said one end portion of said tubular member including opposite side portions having openings formed therethrough through which portions of said socket-defining members project when the latter are shifted out of said first positions thereof and through which said socket-defining members are readily bodily removable in a replaceable manner, said latch means being mounted on said tubular member for reciprocation longitudinally thereof and including portions movable past the outer ends of said openings and engageable with and operable to urge said socket-defining members toward said first positions and to maintain said socket-defining members in said tubular member.

7. A hitch construction comprising a tubular support member, a pair of socket-defining members each including recess means defining a segment of a generally spherical socket and disposed in one end of said support member independent of any positive connection therewith and in a readily bodily removable and replaceable manner for relative movement of at least portions thereof between first and second coacting positions, said portions, when in said first positions, being closely spaced and defining a socket of predetermined size and an elongated hollow neck of smaller transverse dimension than the diameter of said socket opening into said socket at its inner end and longitudinally outwardly of said one end of said tubular member at its outer end, said portions, when in said second positions, being spaced further apart and defining a widened neck portion having a minimum transverse dimension greater than the diameter of said socket of predetermined size, said one end portion of said tubular member including opposite side portions having openings formed therethrough through which portions of said socket-defining members project when the latter are shifted out of said first positions thereof and through which said socket-defining members are readily bodily removable in a replaceable manner, said latch means being mounted on said tubular member for reciprocation longitudinally thereof and including portions movable past the outer ends of said openings and engageable with said portions of said socket-defining members and operable to urge said socket-defining members toward said first positions and to maintain said socket-defining members in said tubular member.

8. The combination of claim 7 wherein said socket-defining members are movably supported from said support member for oscillation between said first and second positions generally about generally parallel axes spaced on diametric opposite sides of said socket and disposed in a plane extending between said socket-defining members and through the approximate center of said socket.

9. The combination of claim 1 wherein said latch means is spring-urged toward said active position, anchor means operative to releasably retain said latch means in said inactive position, and operator means mounted on said support member for movement between first and second positions and adapted to be engaged by a ball member moved inwardly through said neck and into a position coinciding with said socket for shifting said operator means to said second position, movement of said operator means to said second position being operable to shift said anchor means toward said inactive position.

10. The combination of claim 9 wherein said anchor means is automatically movable to said active position upon movement of said latch means toward said inactive position.

(References on following page)

References Cited

UNITED STATES PATENTS

| | | | |
|---|---|---|---|
| 1,335,211 | 3/1920 | Walker | 280—508 |
| 1,732,888 | 10/1929 | Harris et al. | 287—89 |
| 2,292,751 | 8/1942 | Forney | 280—512 X |
| 3,049,366 | 8/1962 | Peters | 280—512 |

FOREIGN PATENTS 718,118   1/1932   France.

BENJAMIN HERSH, *Primary Examiner.*

J. SIEGEL, C. C. PARSONS, *Assistant Examiners.*